April 1, 1941.  E. W. HALL  2,236,901
MEANS FOR ASSEMBLING ELEMENTS OF A BUFFING WHEEL
Original Filed May 5, 1937   7 Sheets-Sheet 1

April 1, 1941.  E. W. HALL  2,236,901

MEANS FOR ASSEMBLING ELEMENTS OF A BUFFING WHEEL

Original Filed May 5, 1937  7 Sheets-Sheet 2

Inventor:
Elisha W. Hall,
Attys

April 1, 1941.  E. W. HALL  2,236,901
MEANS FOR ASSEMBLING ELEMENTS OF A BUFFING WHEEL
Original Filed May 5, 1937  7 Sheets-Sheet 3

Inventor:
Elisha W. Hall,
Att'ys

April 1, 1941. E. W. HALL 2,236,901
MEANS FOR ASSEMBLING ELEMENTS OF A BUFFING WHEEL
Original Filed May 5, 1937   7 Sheets-Sheet 4
Fig. 4.
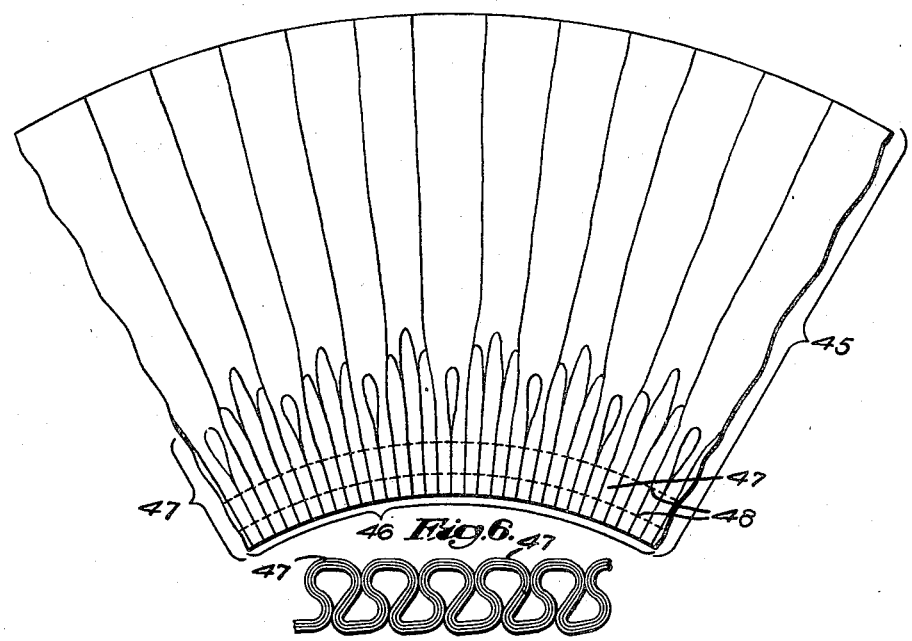
Fig. 5.
Fig. 6.
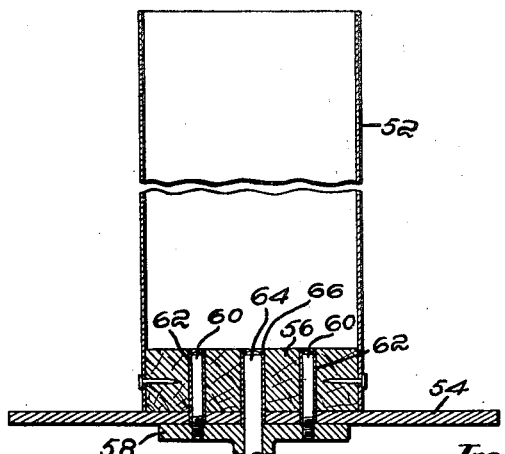
Fig. 7.
Inventor:
Elisha W. Hall,
by Ellery, Barth, Townsend, Miller & Meidine
Attys

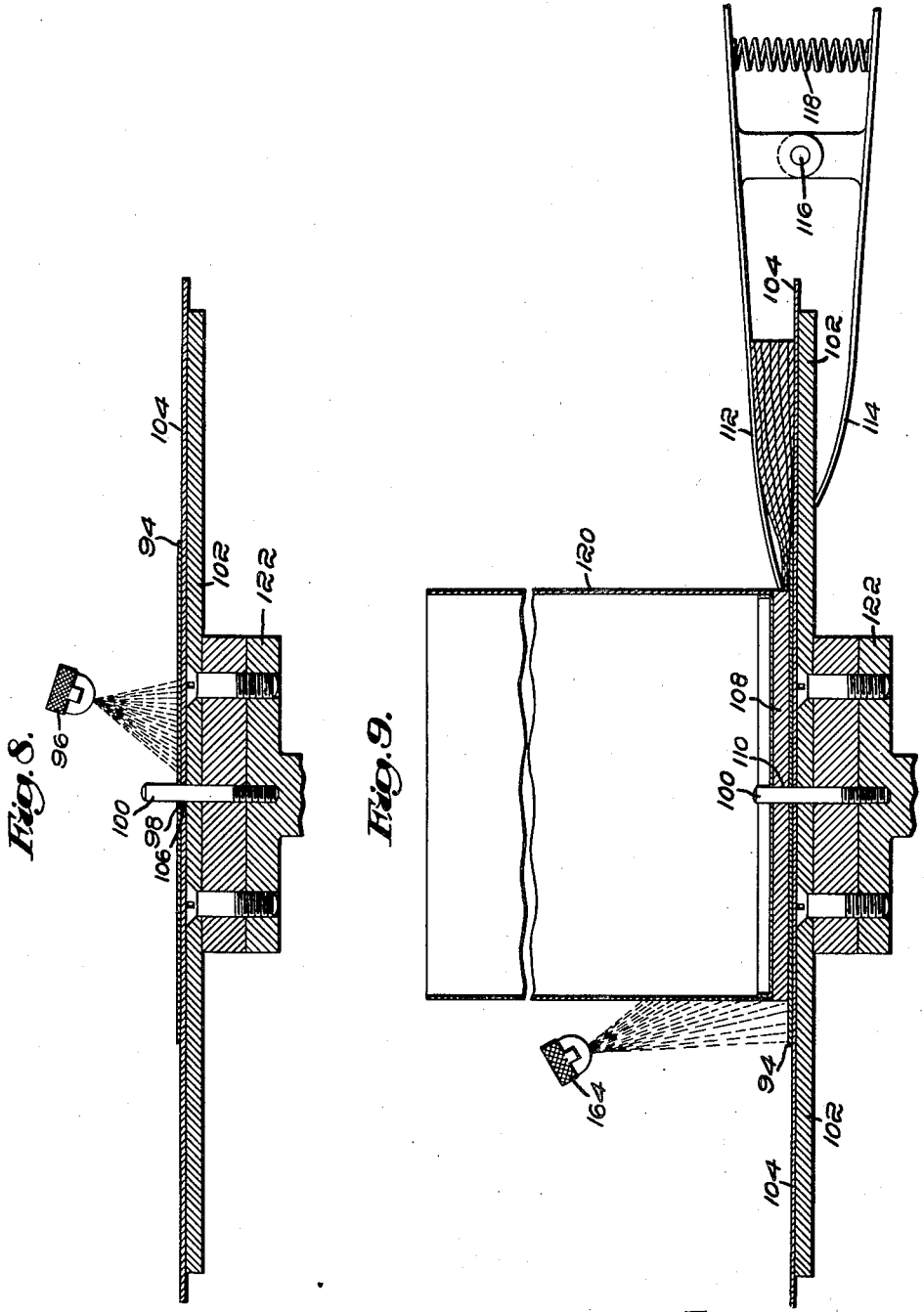

April 1, 1941. E. W. HALL 2,236,901
MEANS FOR ASSEMBLING ELEMENTS OF A BUFFING WHEEL
Original Filed May 5, 1937 7 Sheets-Sheet 6
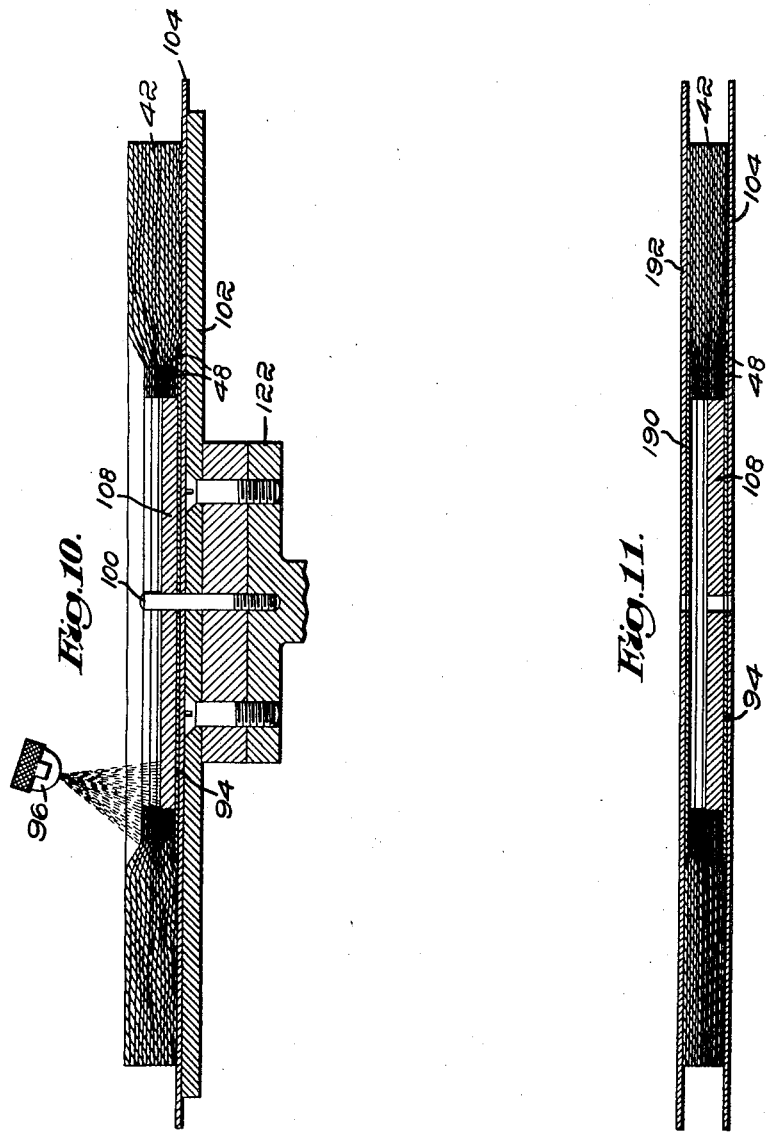
Inventor:
Elisha W. Hall,
by Emery, Booth, Townsend, Miller & Neidner
Attys April 1, 1941.  E. W. HALL  2,236,901
MEANS FOR ASSEMBLING ELEMENTS OF A BUFFING WHEEL
Original Filed May 5, 1937  7 Sheets-Sheet 7

Inventor:
Elisha W. Hall,
by Emery, Booth, Townsend, Miller & Neidner.
Attys

Patented Apr. 1, 1941

2,236,901

UNITED STATES PATENT OFFICE 2,236,901

MEANS FOR ASSEMBLING ELEMENTS OF A BUFFING WHEEL

Elisha W. Hall, Scituate, Mass.

Original application May 5, 1937, Serial No. 140,899. Divided and this application October 9, 1937, Serial No. 168,241

5 Claims. (Cl. 154—1)

This invention relates to means for assembling elements of a buffing or polishing wheel or wheel section of the laminated type, and aims to increase the speed of production and to reduce the cost of manufacture. This application is a division of my pending application Ser. No. 140,899, filed May 5, 1937, wherein the method is claimed. Briefly stated, the invention contemplates assembling and uniting the elements by the use of an adhesive such as latex, prior to the final sewing operation. The illustrative means for carrying out the method employs one or more, preferably a plurality of superposed strips of cloth, preferably bias-cut, and of indefinite length, which are first reduced in length along one margin, as by ruffling, and in the present example the ruffles are fixed and the strips suitably secured together as by stitches in a sewing machine equipped with a ruffling mechanism. This step produces a laminated strip which, due to the shortening of one margin, naturally tends to assume a curved form with the ruffled margin at the inside of the curve. In fact, it is convenient at this point to coil the laminated, ruffled strip helically about a core as by rotating the latter about an axis so that the ruffled margin will be adjacent to the periphery of the core. To this end, it is convenient to constitute the core a part of an automatic take-up mechanism connected to the sewing machine in such manner that the rotating core takes up the strip as fast as it leaves the sewing machine. When the core is completely loaded, the strip is severed, the core is removed, a new core is put in place, and a second length of the strip is started upon the second core. I prefer to handle the strips in this manner instead of supplying the strip directly to the assembling instrumentalities.

The next step, or series of steps, is to assemble a length of the strip with a hub of appropriate material, such as chip-board, and a pair of anchoring disks, one on each face, of larger diameter than the hub, but of smaller diameter than the finished wheel or wheel section, and to apply adhesive, such as latex, to these elements to cause them to adhere to one another. This is conveniently carried out by first coating one anchoring disk on one face with the adhesive, next placing the hub centrally upon the disk, second, placing a temporary core upon and coaxial with the hub, third, helically coiling the strip about the core with the ruffled edge adjacent to the core, meanwhile applying adhesive to the inner, ruffled margin of the strip, until the desired number of convolutions have been built up, fourth, severing the strip, fifth, applying adhesive to the face of the hub exposed within the coiled strip, sixth, coating the second anchoring disk with adhesive, and seventh, placing this disk centrally upon the assembly with its margin overlying the ruffled margin of the strip.

The next step is to compress the assembly firmly in an axial direction as by a hydraulic press which firmly unites the elements and prepares them for the final step of sewing the margins of the anchoring disks to the ruffled margin of the strip, and sewing the disks to the hub.

The various steps of the method are conveniently carried out by apparatus which will be described in connection with the following detailed description of the method, while the scope of the invention will be pointed out more particularly in the appended claims.

In the drawings:

Fig. 4 is a plan of a pieced, biased-cut strip of cloth which is employed;

Fig. 5 is a plan on an enlarged scale of a small section of the laminated, ruffled strip;

Fig. 6 is an elevation, on a further enlarged scale, of the ruffled edge of the laminated strip;

Fig. 7 is a vertical sectional view of the core or spool upon which the laminated, ruffled strip is wound after it leaves the ruffling and sewing machine;

Figs. 8, 9, 10 and 11 are vertical sectional views illustrating the steps in assembling the component parts;

Figure 1:
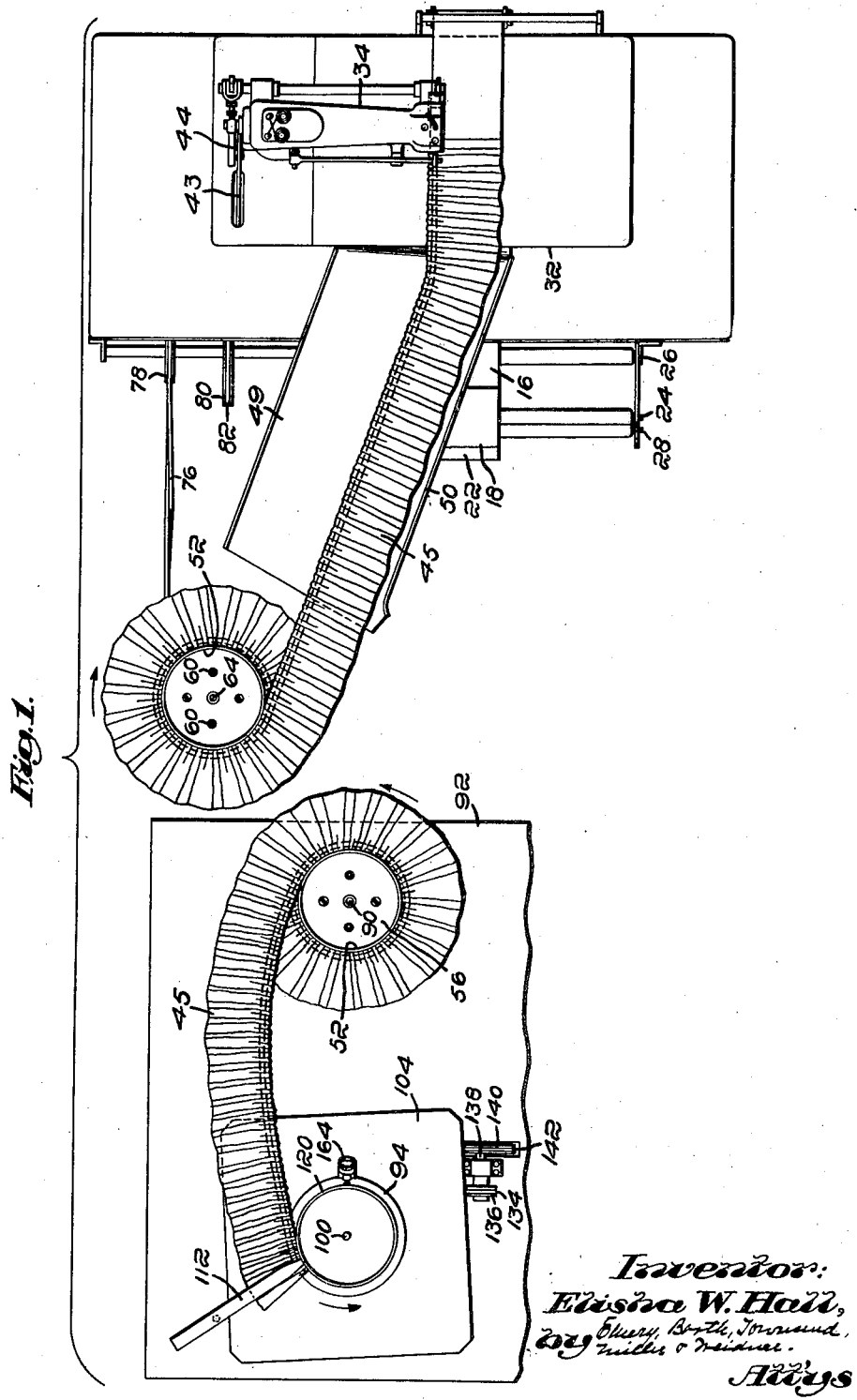
Fig. 1 is a plan of the preferred apparatus employed to carry out the method.
Figure 2:
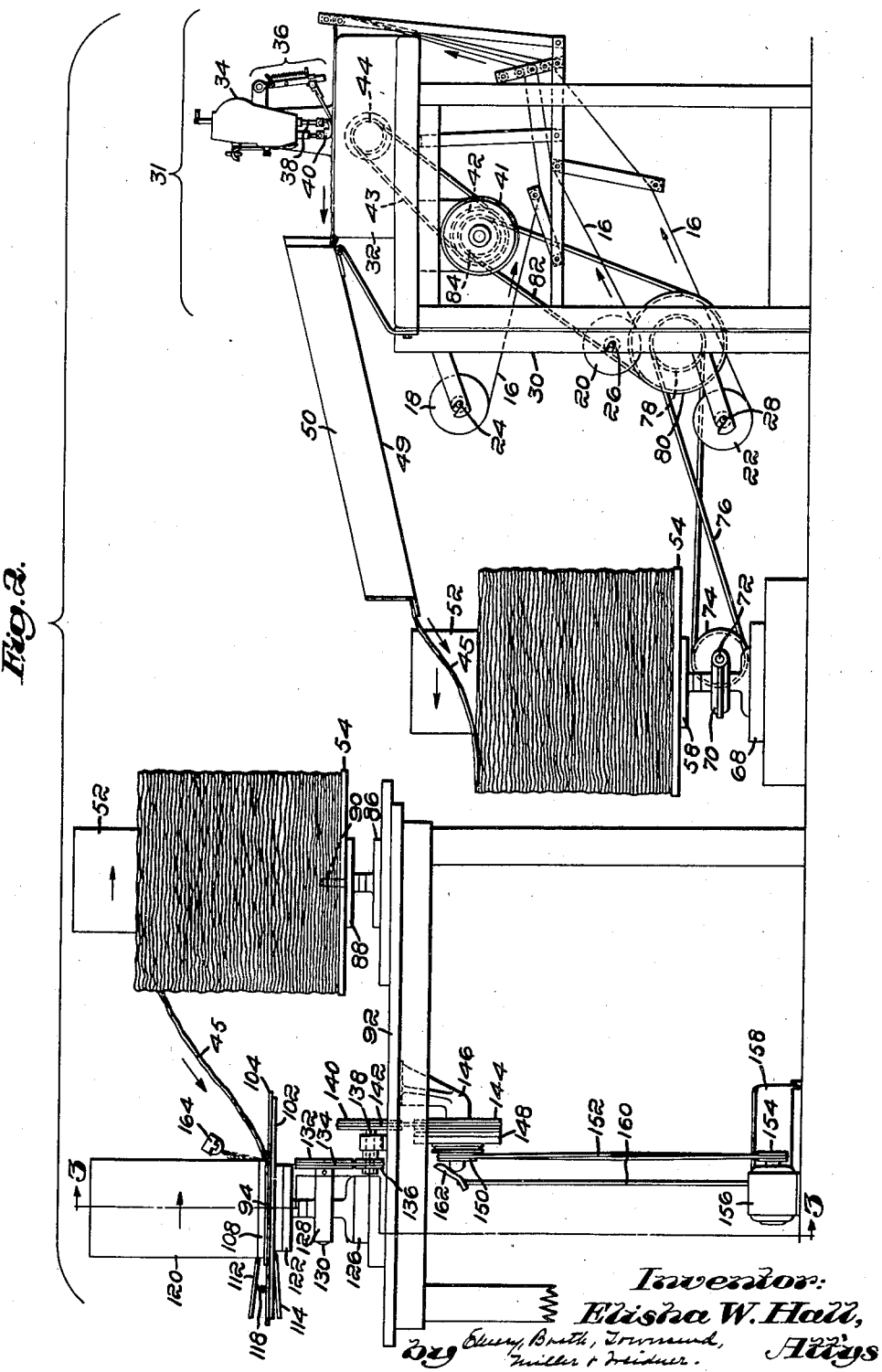
Fig. 2 is an elevation of the same.

Referring to the drawings and to the apparatus illustrated therein by way of example, and having reference at first to Fig. 4, there is shown a pieced, bias cut strip 16 of cloth such as unbleached cotton sheeting, of indefinite length. Referring now to Fig. 2, a plurality of these strips, herein three, are supplied in the form of rolls 18, 20 and 22 on spindles 24, 26, and 28 suitably supported on a frame-work 30 which includes the stand of a ruffling and sewing machine 31 of common form having a base 32, a head 34, a ruffling mechanism 36, a needle-bar 38 carrying two needles (not shown) side by side, and a presser foot 40. The machine is also provided, as usual, with a cloth feed (not shown) by which the cloth is fed to and beyond the ruffling mechanism and the needles and the presser foot. The machine is driven, as usual, by a motor 41, a pulley 42, a belt 43 and a pulley 44. The three strips 16 are led from the supply rolls, over guides which it is deemed unnecessary to describe to the top of the machine base 32 where the superposed strips pass, first to the ruffling mechanism 36, thence to the needles carried by the needle bar 38, and thence to the presser foot 40.

The resulting, laminated, ruffled strip 45 is well illustrated in Figs. 5 and 6, from which it will be seen that one longitudinal margin 46 is shortened by ruffles 47, and the ruffles are maintained and the component laminations secured to each other by two rows of stitches 48. The curved form of the composite, ruffled strip is well illustrated in Fig. 5. The ruffles are closely spaced at the inner, or shorter edge where they are sewed together, and they widen and flare as irregular scallops toward the outer edge.

As already stated, it is preferred not to pass the strip directly to the assembling instrumentalities, but instead to a take-up mechanism, by which a considerable length of the strip is helically coiled and can then be set aside to await its turn in connection with the assembling operation. From the ruffling and sewing mechanism (see Fig. 2) the strip passes over a chute 49 provided with a guide wall 50 and thence to a take-up spool comprising a core 52, a flange 54, and a disk 56 (see Fig. 7). The spool is mounted upon a rotatable support 58 to which it is suitably coupled as by driving pins 60 upstanding from the support and received in sleeves 62 in the flange 54 and disk 56. The support also has a central, upstanding shaft 64 received in a sleeve 66 in the flange and disk.

The support 58 (see Fig. 2) is mounted upon a stand 68 and is rotated at the proper speed in relation to the output of the ruffling and sewing machine by appropriate driving mechanism such as a worm and worm gear set 70 having a shaft 72 to which is secured a pulley 74 connected by a belt 76 to a pulley 78, the latter being secured to and driven by a pulley 80 connected by a belt 82 to a pulley 84 driven by the motor 41.

When the core 52 has reached its capacity, the strip 45 is severed, the spool is taken off and set aside and a new spool takes its place. The loaded spool eventually is placed upon a stand 86, on which is a rotatable support 88 having an upstanding centering pin 90 which is received in the central hole in the spool. The stand 86 is conveniently mounted upon a bench 92 by which the assembling instrumentalities presently to be described are supported.

The first step in assembling operation (see Fig. 8) is to coat an anchoring disk 94 of fabric such as canvas with adhesive such as latex as by the use of a nozzle 96 which is a part of a spray gun of common form preferably held in the hand of the operator. This step may be performed while the disk is held in the operator's other hand, or the disk which has a central hole 98 may first be placed upon a centering pin 100 upstanding from a rotatable table 102 upon which there is first placed a plate 104 also having a central hole 106 which receives the centering pin. In either event, the disk 94 is sprayed on its upper face only with latex and it is then ready for the next step which is to place upon the disk a hub 108 (see Fig. 9) of appropriate material such as chipboard having a central opening 110 which receives the centering pin 100. The disk is larger in diameter than the hub, and on the projecting margin of the disk the end of the ruffled margin of the laminated strip is then placed with its inner edge close to the periphery of the hub, and is clamped as by an appropriate spring clamp having jaws 112 and 114 connected by a pivot 116, the inner ends of the jaws being urged toward each other by a spring 118. An appropriate core 120, herein a cylindrical shell placed upon the centering pin 100 serves as a form about which to coil the strip helically by rotating the table 102, the plate 104, the disk 94, the hub 108, the clamp 112, 116, and the core 120.

While the table might be rotated by hand, it is preferred to rotate it by power, particularly as this leaves the operator's hands free to manipulate the strip. To this end, the table is conveniently rotated as by being secured to a rotatable support 122 to which the centering pin 100 is secured, and this support (see Fig. 2) is mounted on a stand 126 on the bench 92 and is driven by appropriate driving mechanism such as a worm and worm gear set 128 of common form, having a shaft 130, to which is secured a pulley 132 connected by a belt 134 to a pulley 136. The latter is secured to a shaft 138, to which there is also secured a pulley 140 connected by a belt 142 to a pulley 144 loosely mounted on a bracket 146 beneath the table 92. Power is applied to the pulley 144 when desired, as by a friction driving mechanism 148 of common form and having a pulley 150 connected by a belt 152 to a pulley 154 driven by a constantly running motor 156. Control of the friction driving mechanism is by a pedal 158 (see Fig. 3) connected by a rod 160 to a cam 162 which, when the pedal is depressed, causes driving engagement of the friction mechanism. The friction mechanism is a well-known and commercially obtainable unit and requires no further description.

Returning now to Fig. 9, and resuming the assembling operation, rotation of the table 102 with the described parts thereon causes the ruffled strip to be coiled helically about the temporary core 120 and, as the coiling proceeds, adhesive such as latex is applied to the ruffled margin of the successive convolutions of the strip. While the same hand-held spray gun previously used might be employed at this stage, nevertheless I prefer to employ an arrangement which will not only leave both hands of the operator free, but also one in which the operation of a spray gun is coordinated with the mechanism which rotates the work, the arrangement being such that the latex is sprayed upon the work only when the latter rotates.

Figure 3:
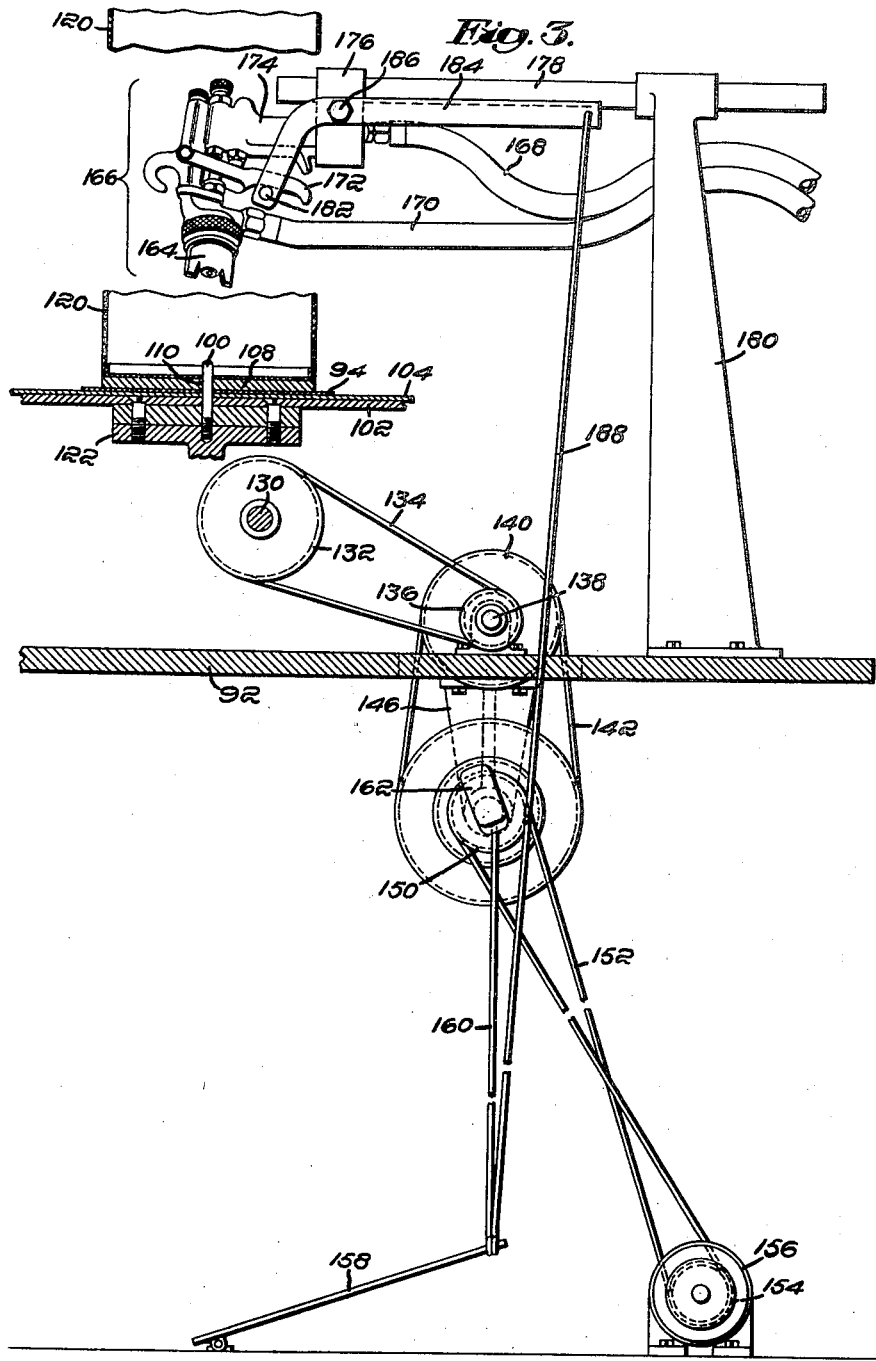
Fig. 3 is a sectional view on an enlarged scale on line 3—3 of Fig. 2.

This arrangement will now be described, reference being had to Fig. 3. A nozzle 164, like the nozzle 96, forms a part of a spray gun 166 to which hoses 168 and 170, one for compressed air and the other for latex are connected. The control of the air and the latex is vested in a lever 172 designed to be operated like a trigger by the fingers of a hand grasping a handle 174. However, in this case, the gun is appropriately supported in fixed position as by securing the handle 174 in a clamp 176 attached to a horizontal arm 178 on an upright 180 secured to the bench 92. Instead of operating the control lever 172 by the fingers, it is foot-operated as by a pin 182 carried by a lever 184 fulcrumed on a pivot 186 and connected by a rod 188 to the pedal 153. Thus, when the pedal is depressed to cause rotation of the work, the spray-gun is operated to spray latex onto the ruffled margin of successive convolutions of the strip.

Returning now to Fig. 9, the nozzle 164 is shown directed toward the side of the temporary core 120, so that the spray of latex will not only fall upon the ruffled margin but will also trickle down the surface of the core and will run between the core and the very edge of the strip adjacent to the core. The nozzle should be set so that only a narrow band of latex is spread. As the core rotates and as the spray falls, the operator, with his hands, pushes the strip down about the core as the convolutions build up. When the desired number of convolutions has been reached, the operator lifts his foot to release the pedal, the rotation of the work ceases and the delivery of latex also ceases. The operator then severs the strip, preferably at a point in line with its commencement end which, it will be remembered, is clamped in place. The operator now removes the clamp and the core.

Referring now to Fig. 10, it will be observed that the convolutions of the strip have an aggregate thickness much greater than the thickness of the hub. However, subsequent pressure will bring the mass down to the required dimension. The operator now, with the hand-held spray gun with its nozzle 96 sprays the upper surface of the hub, and if desirable adds some latex to the inner edge of the strip, and the ruffled margin, taking care, however, that only a very narrow band is applied.

The operator next places a second canvas anchoring disk 190 about the centering pin 100 and with its margin upon the latex-coated, ruffled margin of the strip, places a second plate 192 about the centering pin and upon the assembly, presses the plate down slightly with his hands, and then lifts the entire assembly (see Fig. 11) sandwiched between the upper and lower plates, from the centering pin and lays the same aside, to be carried to and placed in a hydraulic press where it is placed under heavy pressure.

Figure 12:
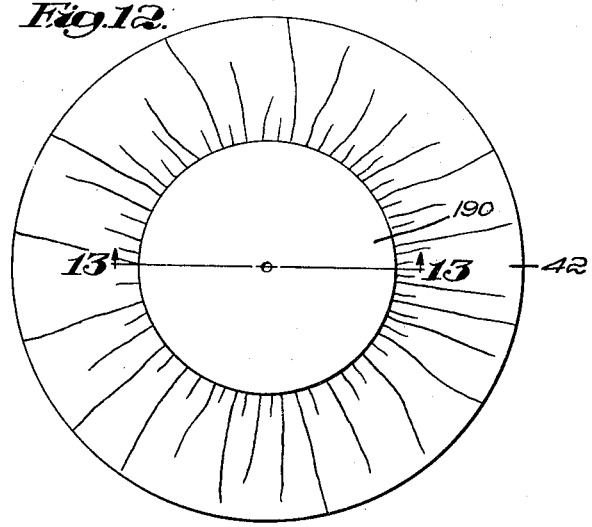
Fig. 12 is a plan of a wheel section completely assembled and ready for sewing.
Figure 13:
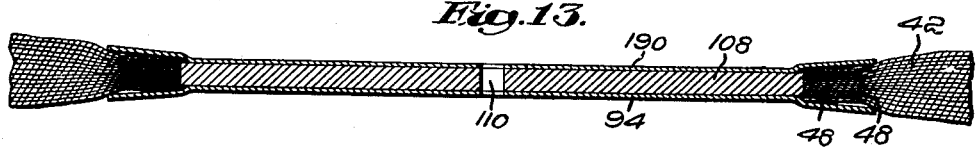
Fig. 13 is a sectional view on an enlarged scale on line 13—13 of Fig. 12.
Figure 14:
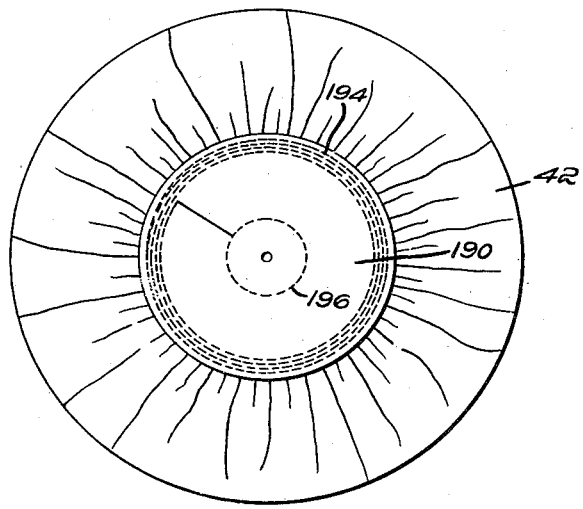
Fig. 14 is a plan of the completed wheel section after the sewing operation.

When taken from the press, the assembly, now adhesively unified appears as shown in Figs. 12 and 13, and it is then taken to a sewing machine, on which it is stitched as shown in Fig. 4 with several spiral convolutions 194 of stitches completely through the anchoring disks and through the strip and a circular row 196 of stitches through the disks and through the hub. If desired, protective disks of cloth of about the same diameter as the anchoring disks are coated with adhesive such as latex and applied to the anchoring disks to protect the stitches and finally, a hole of the correct diameter for a spindle is punched through the assembly. The wheel section is then ready for use and may be assembled with one or more other like sections upon a spindle and clamped thereto by clamping plates.

Having thus described the preferred apparatus, but without limiting myself thereto, what I claim and desire by Letters Patent, to secure is:

1. In apparatus for use in coiling a strip and securing the convolutions of the coil to one another, the combination of a rotatable support for the strip, a core axially alined with and supported by said support, means for securing an end of a strip to said support adjacent to said core so that rotation of said support shall wind said strip about said core, a spray gun for spraying adhesive onto said strip, and means to coordinate the rotation of said support and the operation of said spray gun so that the latter shall deliver adhesive only during the rotation of said support.

2. Apparatus for use in coiling a strip and securing the convolutions of the coil to one another, the same comprising in combination, a strip supply spool comprising a vertical, rotatable core, and a horizontal flange projecting laterally from said core to support a strip wound about said core, a horizontal table rotatable about a vertical axis, a centering pin upstanding from said table, a plate resting upon said table and having a hole which receives said centering pin, a second vertical core disposed about said centering pin and supported by said plate and table, a clamp to clamp an end of the strip to said plate adjacent to said core so that rotation of said table shall wind the strip helically about said second core, and means for operating upon the strip to cause each succeeding convolution to be secured to the next preceding convolution, said means comprising a spray gun for directing adhesive toward said plate and said second core so that the same shall discharge adhesive onto the strip as the latter is being unwound from the first-named core and wound about said second core.

3. Apparatus for use in coiling a strip and securing the convolutions of the coil to one another, the same comprising, in combination, a horizontal table rotatable about a vertical axis, a centering pin upstanding from said table, a plate resting upon said table and having a hole which receives said centering pin, a vertical core disposed about said centering pin and supported by said plate and table, a clamp to clamp one end of the strip to said plate adjacent to said core so that rotation of said table shall wind the strip helically about said core, and a spray gun for directing adhesive toward said plate and said core so that the same shall discharge adhesive onto the strip as the latter is being wound about said core.

4. Apparatus for use in coiling a strip and securing the convolutions of the coil to one another, the same comprising, in combination, a rotatable support for the strip, a core axially alined with and supported by said support, means for securing one end of said strip to said support adjacent to said core so that rotation of said support shall wind the strip helically about said core, and means for operating upon said strip to cause each succeeding convolution to be secured to the next preceding convolution, said means comprising a nozzle arranged to deliver adhesive to that margin of the strip which is the nearer to said core.

5. Apparatus for use in helically coiling a strip and securing the convolutions to one another, the same comprising, in combination, a rotatable element to support the strip while it is being coiled, means to secure one end of the strip to said element so that rotation of the latter shall coil said strip, and means for operating upon the strip to cause each succeeding convolution to be secured to the next preceding convolution, the last-named means including an instrumentality to deliver adhesive to the strip as the latter is being coiled.

ELISHA W. HALL.